(12) United States Patent
Watson

(10) Patent No.: US 11,541,816 B2
(45) Date of Patent: Jan. 3, 2023

(54) POWER BOX SIDE STEP

(71) Applicant: Magna Exteriors Inc., Concord (CA)

(72) Inventor: Bradley E. Watson, Barrie (CA)

(73) Assignee: Magna Exteriors Inc., Concord (CA)

( * ) Notice: Subject to any disclaimer, the term of this patent is extended or adjusted under 35 U.S.C. 154(b) by 80 days.

(21) Appl. No.: 17/145,977

(22) Filed: Jan. 11, 2021

(65) Prior Publication Data

US 2021/0129759 A1 May 6, 2021

Related U.S. Application Data

(63) Continuation of application No. 16/382,956, filed on Apr. 12, 2019, now Pat. No. 10,919,453.

(60) Provisional application No. 62/657,366, filed on Apr. 13, 2018.

(51) Int. Cl.
*B60R 3/02* (2006.01)
*B60R 3/00* (2006.01)
*H01H 13/06* (2006.01)

(52) U.S. Cl.
CPC ............. *B60R 3/02* (2013.01); *B60R 3/002* (2013.01); *H01H 13/06* (2013.01)

(58) Field of Classification Search
CPC ............ B60R 3/02; B60R 3/002; H01H 13/06
See application file for complete search history.

(56) References Cited

U.S. PATENT DOCUMENTS

| | | | |
|---|---|---|---|
| 1,456,780 | A | 5/1923 | Kermode |
| 1,515,449 | A | 11/1924 | Vose |
| 1,542,342 | A | 6/1925 | Doctor |
| 1,633,427 | A | 6/1927 | Wiese |
| 1,701,581 | A | 2/1929 | McWhinnie |
| 1,982,748 | A | 12/1934 | Lamonica et al. |
| 2,062,026 | A | 11/1936 | Hassel |
| 2,206,744 | A | 7/1940 | Loecher |
| 2,818,594 | A | 1/1958 | Dawkins |
| 3,039,562 | A | 6/1962 | Wagner |
| 3,229,993 | A | 1/1966 | Riddle |
| 3,404,581 | A | 10/1968 | Kraus |
| 3,608,957 | A | 9/1971 | Maneck |
| 3,758,134 | A | 9/1973 | Stewart |

(Continued)

FOREIGN PATENT DOCUMENTS

| | | |
|---|---|---|
| CA | 2362976 A1 | 8/2000 |
| CA | 2362976 C | 4/2008 |

(Continued)

OTHER PUBLICATIONS

International Search Report for PCT/IB2018/057194 dated Dec. 13, 2018 (3-pages).

(Continued)

*Primary Examiner* — Bryan A Evans
(74) *Attorney, Agent, or Firm* — Warn Partners, P.C.

(57) ABSTRACT

An articulating step assembly for a vehicle which includes a mount for attachment to a vehicle, a step member and an articulating linkage connecting the mount and the step for stowing and deploying the step. A motor is attached to the linkage to provide raising and lowering of the step. A weather sealed non-contact switch located on the assembly for actuating the motor and linkage in response to movement of the step in a predetermined direction for deploying the step.

21 Claims, 16 Drawing Sheets

(56) References Cited

U.S. PATENT DOCUMENTS

| | | |
|---|---|---|
| 3,762,742 A | 10/1973 | Bucklen |
| 3,955,827 A | 5/1976 | Wonigar |
| 3,957,284 A | 5/1976 | Wright |
| 3,986,724 A | 10/1976 | Rivinius |
| 4,020,920 A | 5/1977 | Abbott |
| 4,167,272 A | 9/1979 | Wright et al. |
| 4,185,849 A | 1/1980 | Jaeger |
| 4,189,955 A | 2/1980 | Bishop |
| 4,231,583 A | 11/1980 | Learn |
| 4,356,894 A | 11/1982 | Everett |
| 4,909,700 A | 3/1990 | Fontecchio et al. |
| 4,935,638 A | 6/1990 | Straka |
| 4,943,085 A | 7/1990 | Straka |
| 5,193,829 A | 3/1993 | Holloway et al. |
| 5,195,609 A | 3/1993 | Ham et al. |
| 5,228,707 A | 7/1993 | Yoder |
| 5,265,896 A | 11/1993 | Kravitz |
| 5,501,475 A | 3/1996 | Bundy |
| 5,538,269 A | 7/1996 | McDaniel et al. |
| 5,601,300 A | 2/1997 | Fink et al. |
| 5,605,071 A | 2/1997 | Buchanan, Jr. |
| 5,697,626 A | 12/1997 | McDaniel et al. |
| 5,806,869 A | 9/1998 | Richards |
| 5,842,709 A | 12/1998 | Maccabee |
| 5,895,064 A | 4/1999 | Laubach |
| 6,036,208 A | 3/2000 | Frerichs |
| 6,135,472 A | 10/2000 | Wilson et al. |
| 6,149,172 A | 11/2000 | Pascoe et al. |
| 6,325,397 B1 | 12/2001 | Pascoe et al. |
| 6,375,207 B1 | 4/2002 | Dean et al. |
| 6,390,343 B1 | 5/2002 | Jain |
| 6,406,045 B1 | 6/2002 | Farkash |
| 6,435,534 B1 | 8/2002 | Stone |
| 6,533,303 B1 | 3/2003 | Watson |
| 6,581,946 B2 | 6/2003 | Lund et al. |
| 6,641,158 B2 | 11/2003 | Leitner |
| 6,676,223 B2 | 1/2004 | Kolpasky |
| 6,709,137 B1 | 3/2004 | Glovak et al. |
| 6,726,230 B2 | 4/2004 | Weir |
| 6,769,527 B1 | 8/2004 | Paris |
| 6,869,092 B1 | 3/2005 | Henn |
| 6,880,843 B1 | 4/2005 | Greer, Jr. |
| 6,929,163 B1 | 8/2005 | Pedrini et al. |
| 6,938,909 B2 | 9/2005 | Leitner |
| 6,942,233 B2 | 9/2005 | Leitner et al. |
| 6,955,370 B2 | 10/2005 | Fabiano et al. |
| 6,959,937 B2 | 11/2005 | Schneider et al. |
| 6,971,657 B2 | 12/2005 | King et al. |
| 7,007,961 B2 | 3/2006 | Leitner et al. |
| 7,017,927 B2 | 3/2006 | Henderson et al. |
| 7,055,839 B2 | 6/2006 | Leitner |
| 7,070,194 B2 | 7/2006 | Garland et al. |
| 7,086,656 B2 | 8/2006 | Kolpasky et al. |
| 7,118,120 B2 | 10/2006 | Lee et al. |
| 7,163,221 B2 | 1/2007 | Leitner |
| 7,264,290 B2 | 9/2007 | Tamaya |
| 7,287,771 B2 | 10/2007 | Lee et al. |
| 7,318,596 B2 | 1/2008 | Scheuring, III et al. |
| 7,367,574 B2 | 5/2008 | Leitner |
| 7,377,531 B2 | 5/2008 | Fabiano et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,444,210 B2 | 10/2008 | Breed et al. |
| 7,469,916 B2 | 12/2008 | Watson |
| 7,513,520 B2 | 4/2009 | Okuyama |
| 7,513,565 B2 | 4/2009 | Watson |
| 7,584,975 B2 | 9/2009 | Leitner |
| 7,607,674 B2 | 10/2009 | Watson |
| 7,637,519 B2 | 12/2009 | Leitner et al. |
| 7,692,542 B2 | 4/2010 | Outzs |
| 7,823,896 B2 | 11/2010 | VanBelle et al. |
| 7,976,042 B2 | 7/2011 | Watson et al. |
| 8,136,826 B2 | 3/2012 | Watson |
| 8,157,277 B2 | 4/2012 | Leitner et al. |
| 8,240,222 B2 | 8/2012 | Yoshioka et al. |
| 8,262,113 B1 | 9/2012 | Chafey et al. |
| 8,297,635 B2 | 10/2012 | Agoncillo et al. |
| 8,342,551 B2 | 1/2013 | Watson |
| 8,602,431 B1 | 12/2013 | May |
| 8,662,512 B1 | 3/2014 | May |
| 8,668,217 B2 | 3/2014 | Ziaylek |
| 8,714,575 B2 | 5/2014 | Watson |
| 8,739,342 B1 | 6/2014 | Johnson et al. |
| 8,833,781 B2 | 9/2014 | Hayes |
| 8,833,782 B2 | 9/2014 | Huotari et al. |
| 8,919,497 B2 | 12/2014 | Rund |
| 9,272,667 B2 | 3/2016 | Smith |
| 9,649,983 B2 | 5/2017 | Watson |
| 10,272,842 B2 | 4/2019 | Du et al. |
| 10,286,847 B2 | 5/2019 | Derbis |
| 10,322,677 B1 | 6/2019 | Leitner et al. |
| 10,343,610 B2 | 7/2019 | Long et al. |
| 10,377,313 B1 | 8/2019 | Brunner et al. |
| 10,399,500 B2 | 9/2019 | Hayes |
| 10,538,204 B2 | 1/2020 | Long et al. |
| 10,919,453 B2 | 2/2021 | Watson |
| 11,077,802 B2 | 8/2021 | Long et al. |
| 11,208,045 B2 | 12/2021 | Watson |
| 2003/0094781 A1 | 5/2003 | Jaramillo et al. |
| 2003/0132595 A1 | 7/2003 | Fabiano et al. |
| 2003/0178805 A1 | 9/2003 | Elrod |
| 2003/0184039 A1 | 10/2003 | Schumacher |
| 2003/0222423 A1 | 12/2003 | Weir |
| 2004/0004339 A1 | 1/2004 | Fichter |
| 2004/0070163 A1 | 4/2004 | Schneider et al. |
| 2004/0084868 A1 | 5/2004 | Leitner et al. |
| 2004/0100063 A1 | 5/2004 | Henderson et al. |
| 2004/0173987 A1 | 9/2004 | Chapman et al. |
| 2004/0174043 A1 | 9/2004 | Bradsen et al. |
| 2005/0012295 A1 | 1/2005 | Chevalier et al. |
| 2005/0062252 A1 | 3/2005 | Vincent |
| 2005/0087950 A1 | 4/2005 | Draper et al. |
| 2005/0127635 A1 | 6/2005 | Fichter |
| 2005/0151340 A1 | 7/2005 | Leitner |
| 2005/0179226 A1 | 8/2005 | Kolpasky et al. |
| 2006/0254376 A1 | 11/2006 | Ota et al. |
| 2007/0085376 A1 | 4/2007 | Kuntze et al. |
| 2007/0126201 A1 | 6/2007 | Crandall |
| 2007/0138757 A1 | 6/2007 | Kuntze et al. |
| 2007/0159308 A1 | 7/2007 | Johnston |
| 2007/0194916 A1 | 8/2007 | Hewitt et al. |
| 2007/0267842 A1 | 11/2007 | Seibert et al. |
| 2008/0106058 A1 | 5/2008 | Demick |
| 2008/0271936 A1 | 11/2008 | Kuntze et al. |
| 2011/0226558 A1 | 9/2011 | Fravel et al. |
| 2012/0098231 A1 | 4/2012 | Huotari et al. |
| 2012/0104719 A1 | 5/2012 | Hayes |
| 2015/0094877 A1 | 4/2015 | Tahnoose et al. |
| 2015/0123374 A1 | 5/2015 | Smith |
| 2016/0023609 A1* | 1/2016 | Watson .................. B60R 3/002 280/166 |
| 2016/0339844 A1 | 11/2016 | Pribisic |
| 2017/0200335 A1 | 7/2017 | Da Deppo et al. |
| 2018/0297530 A1 | 10/2018 | Stickles et al. |
| 2019/0308558 A1* | 10/2019 | Long .................. B61D 23/025 |
| 2020/0339039 A1 | 10/2020 | Watson |
| 2021/0129759 A1 | 5/2021 | Watson |
| 2021/0323480 A1* | 10/2021 | Long .................. B60R 3/02 |
| 2022/0097609 A1 | 3/2022 | Watson |
| 2022/0185190 A1 | 6/2022 | Johnson et al. |

FOREIGN PATENT DOCUMENTS

| | | |
|---|---|---|
| CN | 1209691 A | 3/1999 |
| CN | 1652955 A | 8/2005 |
| CN | 102424021 A | 4/2012 |
| CN | 103158623 A | 6/2013 |
| CN | 203601134 U | 5/2014 |
| DE | 1064364 B | 8/1959 |
| EP | 2216202 A1 | 8/2010 |
| JP | 2008222183 A | 9/2008 |
| JP | 2016188031 A | 11/2016 |

(56) References Cited

FOREIGN PATENT DOCUMENTS

| | | | |
|---|---|---|---|
| JP | 2016188044 | A | 11/2016 |
| WO | 2000050262 | A1 | 8/2000 |
| WO | 2019053698 | A1 | 3/2019 |
| WO | 2019232531 | A3 | 12/2019 |
| WO | 2022084953 | A1 | 4/2022 |

OTHER PUBLICATIONS

European Search Report for Application No. EP 18 19 4184 dated May 7, 2019 (1-page).
European Extended Search Report for Application No. EP 18 78 5238 dated Mar. 19, 2020 (2-pages).

\* cited by examiner

POWER BOX SIDE STEP

CROSS-REFERENCE TO RELATED APPLICATIONS

This application is a continuation of U.S. patent application Ser. No. 16/382,956, filed Apr. 12, 2019, which claims the benefit of U.S. Provisional Patent Application No. 62/657,366, filed Apr. 13, 2018. The disclosures of the above applications are incorporated herein by reference.

FIELD OF THE INVENTION

The present invention relates to power box side step on vehicle. More particularly the present invention relates to reliable activation of the power side step from outside of the vehicle

BACKGROUND OF THE INVENTION

For a powered side step to be activated by some means of electrical switching, there must be a reliable type of switching that is not affected by the environment of the side step device. This environment includes to accumulation of possible snow, ice and mud build on the step surfaces and surrounding linkages. Current touchless switching technologies such as those being used on power lift gate systems can provide false sensing or no sensing due to blockage in the sensing field due to debris as previously mentioned.

The objective is to employ a switching method with minimal mechanical moving components to provide reliable activation under all environmental conditions. This activation must have an ergonomically acceptable movement of a customer's foot with a minimum of force and effort to use the device to provide a hands free operation.

Currently, there are no powered side box steps in production that have a motion sensing or other external sensing device for raising and lowering the step from the outside of the vehicle. Typically the steps will only deploy when a door of the vehicle is opened.

Powered lift gates on the rear of utility vehicles are being produced by a number of EOM's. These have been designed to create a hands free operation of the lift gate to open the lift gate by motion sensors or the like which detect the waving of an operators foot at a location which is typically under a bumper. When certain conditions of snow or ice accumulation exist at the bottom of the bumper area, these switching methods have proven too unreliable by waving one's foot under the bumper to typically activate the lift gate opening. Such switches are also prone to unintentional operation.

Therefore it is a goal to provide a device that has limited or no moving parts to wear out. And there is no need to be in actual contact with the customer's foot to the vehicle.

It is also a goal to prevent potential failures of the switch and step to function due to debris or obstructions in an area such as the lower side of a vehicle where snow and ice buildup is impossible to prevent in winter driving conditions.

SUMMARY OF THE INVENTION

An articulating step assembly for a vehicle which includes a mount for attachment to a vehicle, a step member and an articulating linkage connecting the mount and the step for stowing and deploying the step. A motor is attached to the linkage to provide raising and lowering of the step. A weather sealed non-contact switch located on the assembly for actuating the motor and linkage in response to movement of the step in a predetermined direction for deploying the step.

The use of a reed switch which has no moving parts that is activated by a change of magnetic field strength adjacent to the switch solves the problem of debris buildup. A slight upward movement of the step with one's foot creates this magnetic switching action.

This invention employs a kick to activate electrical switch with reed switch and magnet combination.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
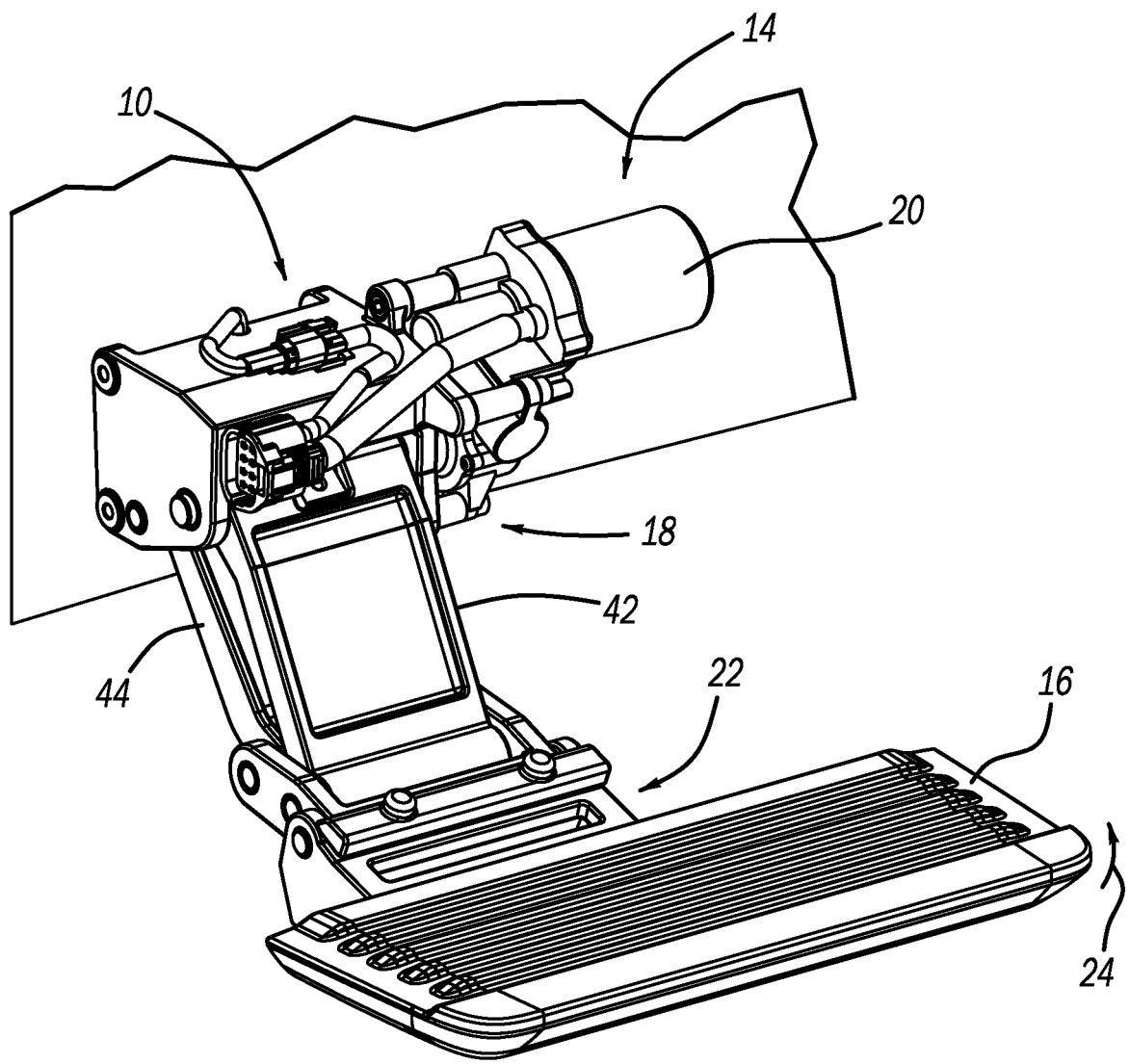
FIG. 1 is a perspective view of the articulating step of the present invention shown in a deployed position and attached to a surface of a vehicle.

Referring now to FIG. 1 there is shown an articulating step assembly for a vehicle is generally shown at 10. Such articulating steps and powered running boards and the like are shown in commonly assigned U.S. Pat. No. 7,118,120 issued Oct. 10, 2006 entitled "Powered Running Board"; and U.S. Patent Application 62/769,240 filed Nov. 19, 2018 entitled "Power Retractable Bumper Step" which are incorporated by reference herein. Articulating step assembly 10 includes a mount 12 for attachment to a vehicle 14, a step member 16 and an articulating linkage, generally indicated at 18. Articulating linkage 18 is operably connected between the mount 12 and the step member 16 for stowing and deploying the step member 16. A motor 20 is attached to the linkage 18 to provide raising and lowering of the step member 16. A switch 22 selected from pushbutton, other type of weather sealed mechanical switches, photoelectric switches or other non-contact switches, generally indicated at 22 is located on the assembly for actuating the motor 20 and linkage 18 in response to movement of the step 16 in a predetermined direction, such as upward in arrow direction 24 for deploying the step 16.

Figure 9:
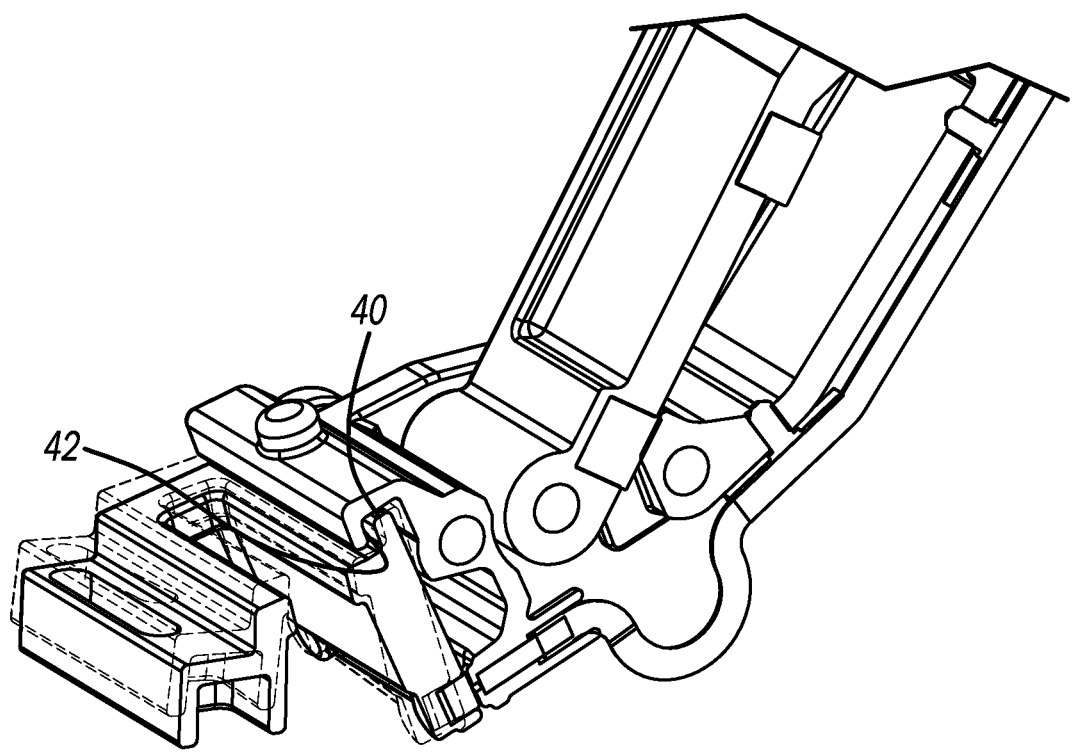
FIG. 9 is a sectional view showing the magnet of the reed switch tilted up for actuation of the step mechanism.
Figure 10:
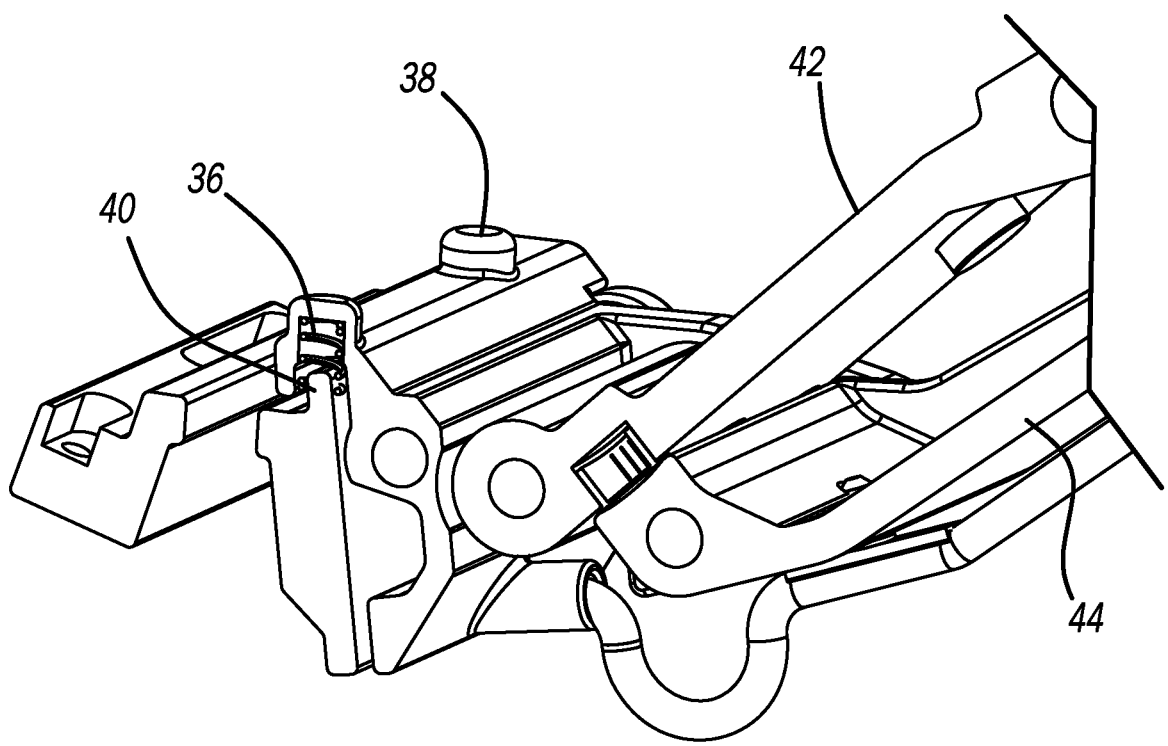
FIG. 10 is a is a sectional view showing the biasing spring for biasing of the step member.
Figure 15:
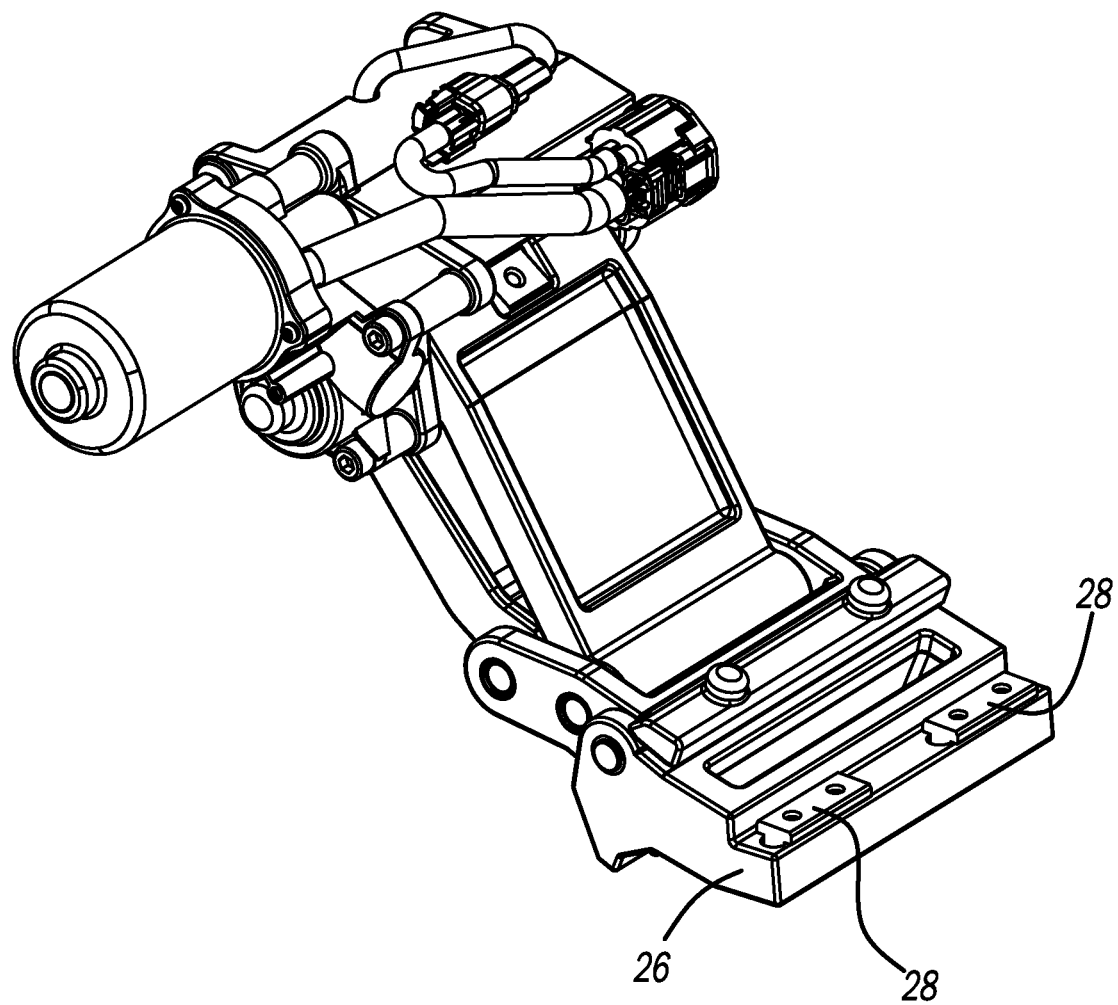
FIG. 15 is a perspective view showing the step in a lowered position and showing the step mount provisions.
Figure 16:
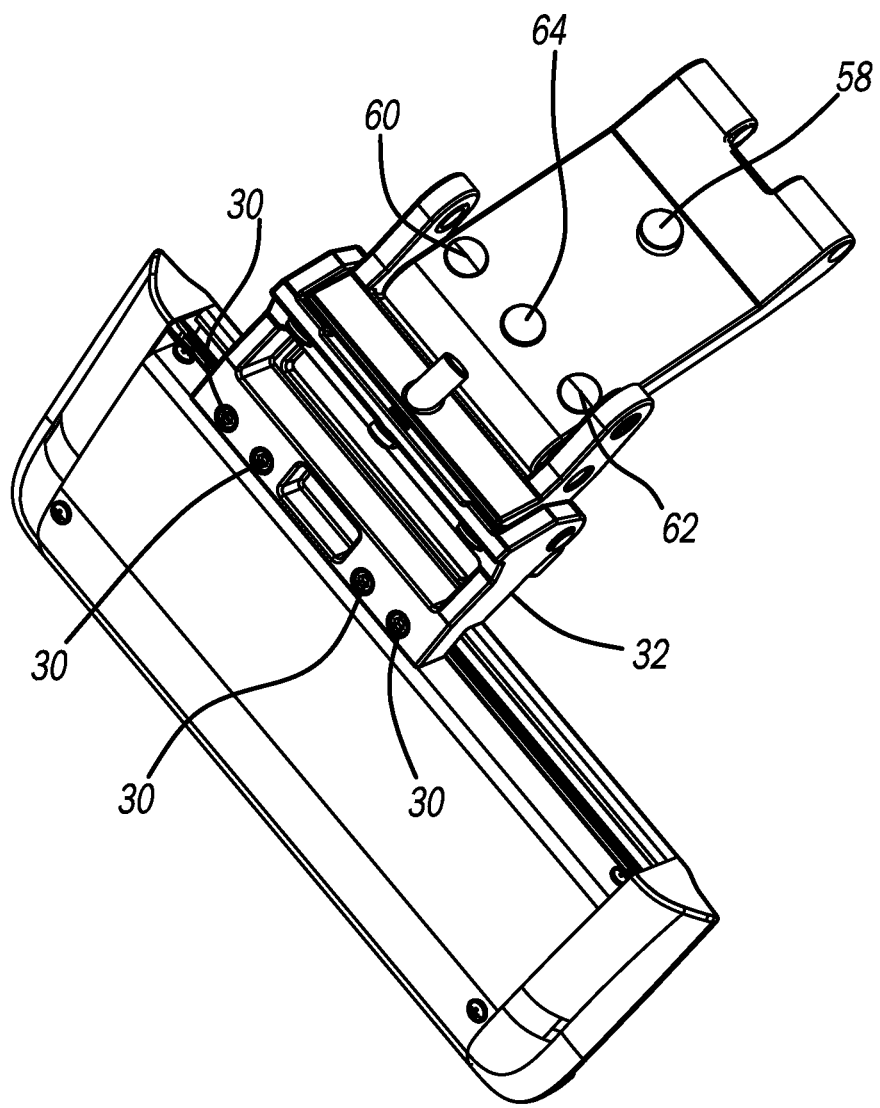
FIG. 16 is a bottom perspective view of the assembly.

Step 16 is connected to a base member 26 by way of T-nuts 28 and screws 30 (shown in FIGS. 15 and 16) is retained in a channel in the link member (as seen in FIGS. 9 and 10). The base member 26 is pivotally attached to a link member 32 at pivot point 34. The step 16 is biased into its downward position by way of springs 36 and 38 operating on a flange 40 which is retained loosely in a channel 42 in link member for allowing limited pivoting of the base member 26. The range of motion of the step may be utilized in a range necessary for a particular application. Generally, the range of motion would be in a range of greater than 0 to about 45 degrees; typically from about 3 to about 10 degrees and preferably from about 4 to about 7 degrees in an upward direction. In a preferred embodiment the base is tiltable in an upward direction for about 5 degrees of motion.

Figure 2:
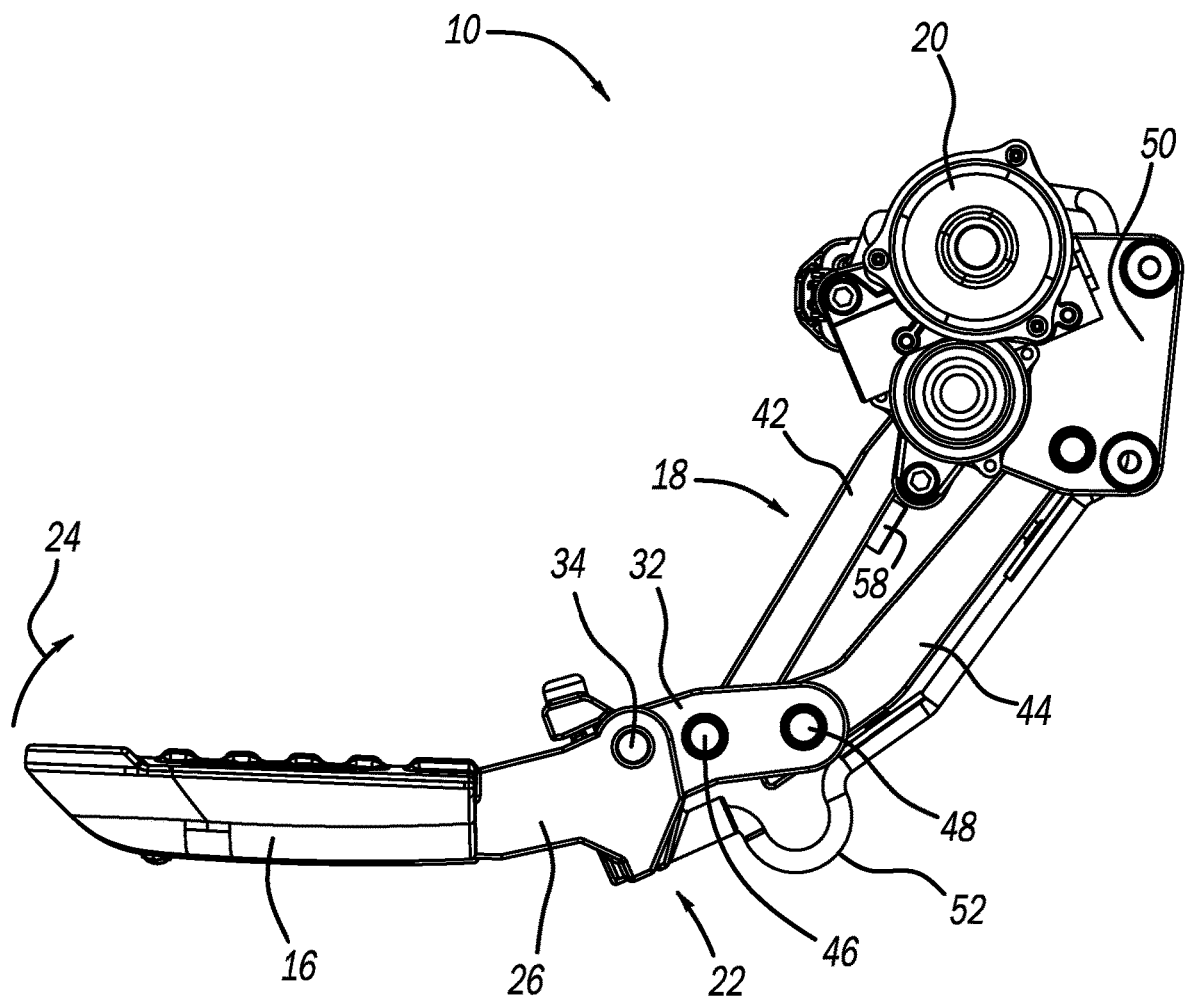
FIG. 2 is a side view of the articulating step of FIG. 1.
Figure 3:
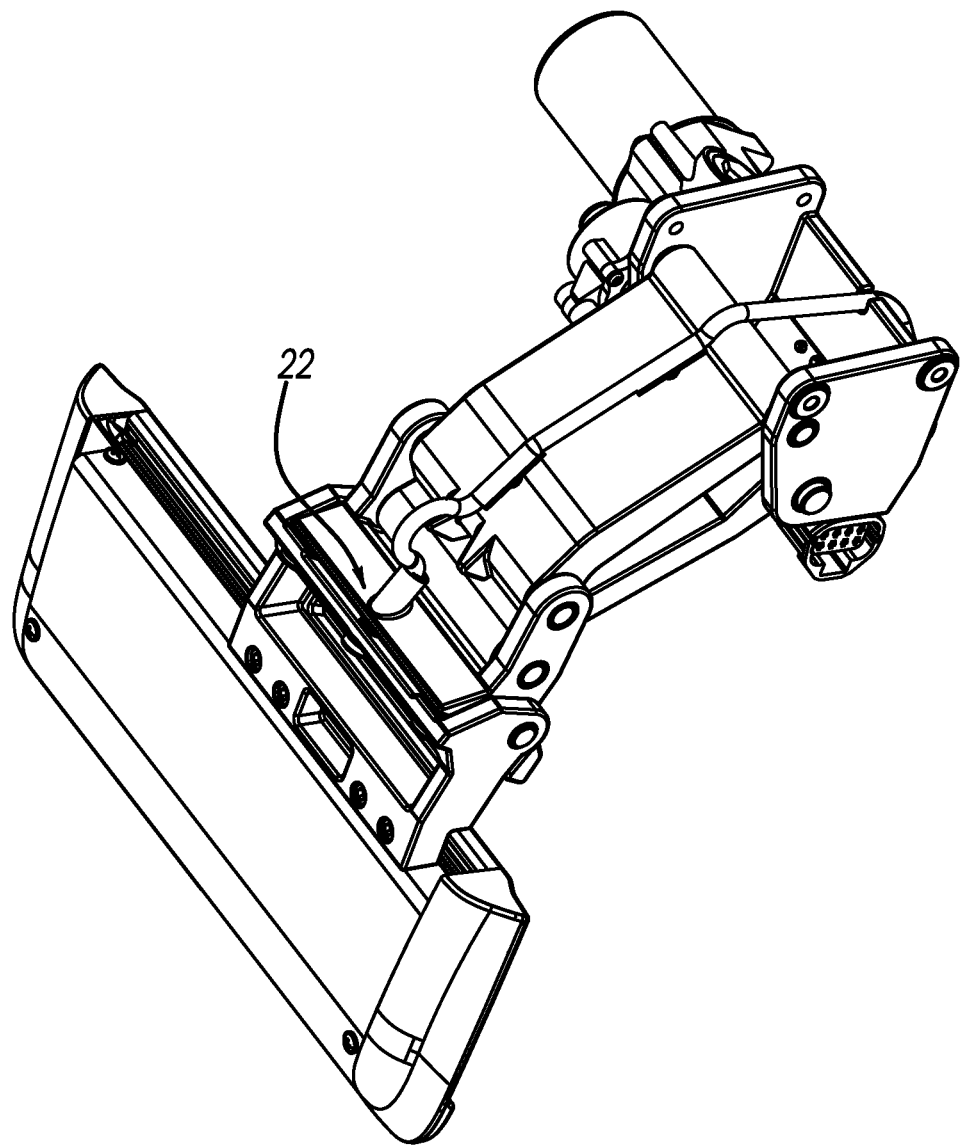
FIG. 3 is a bottom rear perspective view of the articulating step of FIG. 1.
Figure 4:
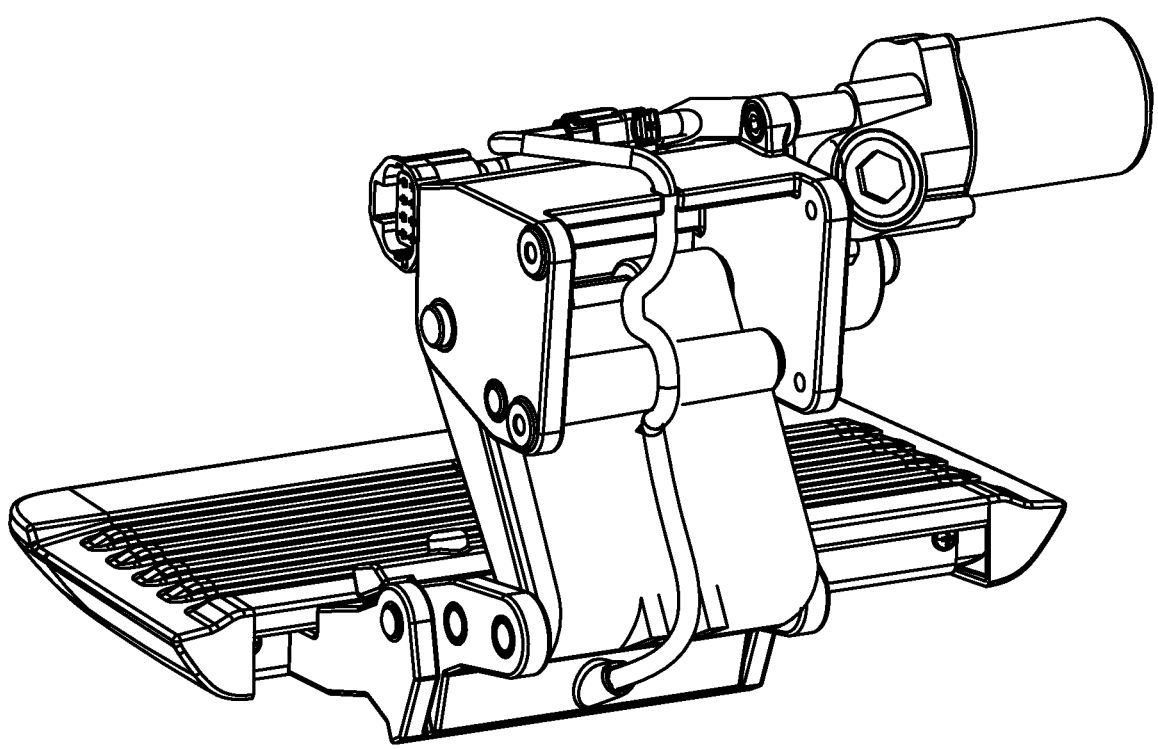
FIG. 4 is a rear perspective view of the articulating step of the present invention shown in a stowed position.
Figure 5:
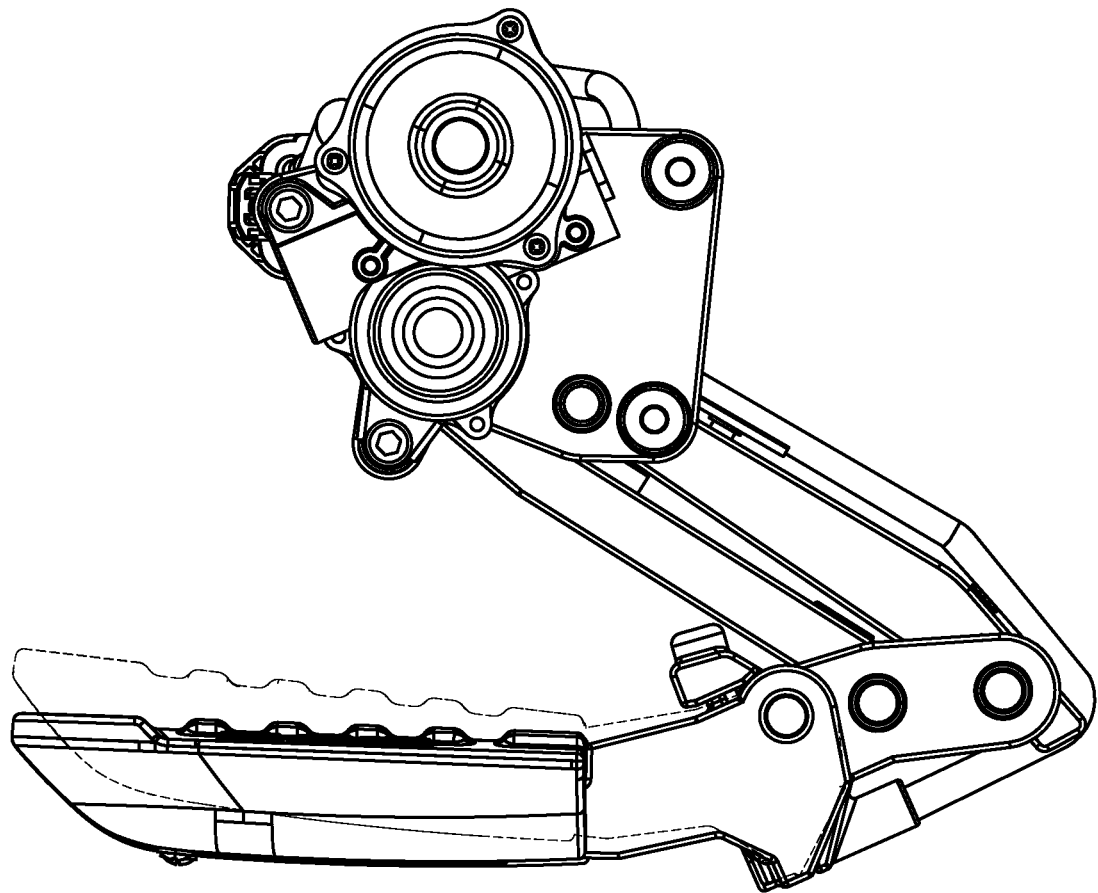
FIG. 5 is a side view of the articulating step of FIG. 4.
Figure 6:
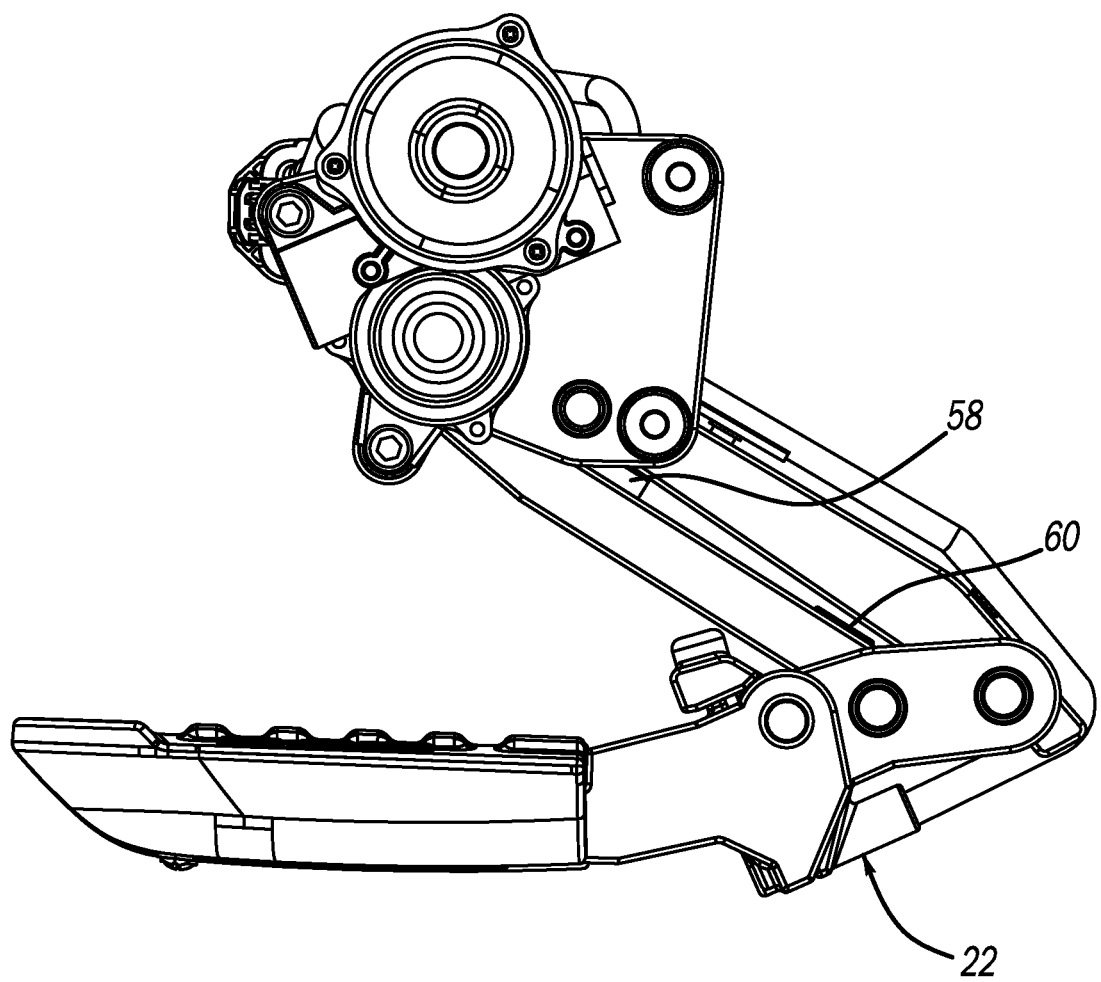
FIG. 6 is a side view of the articulating step of FIG. 5 illustrating the rotation of the step for activating a reed switch for deployment of the step.
Figure 7:
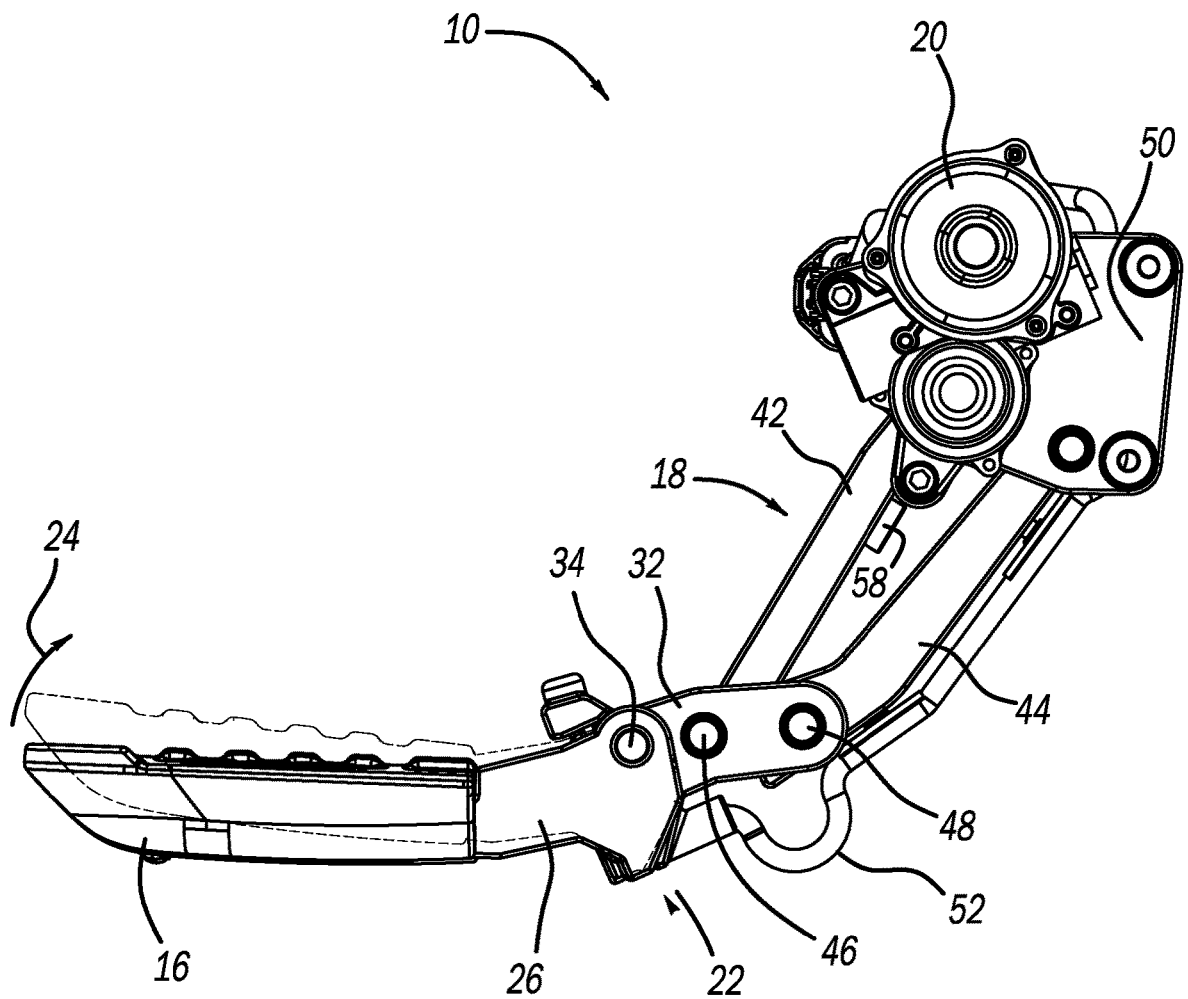
FIG. 7 is a side view of the articulating step of the present invention in the deployed position illustrating tilting of the step member for activating the switch to stow the step in the stowed position.
Figure 8:
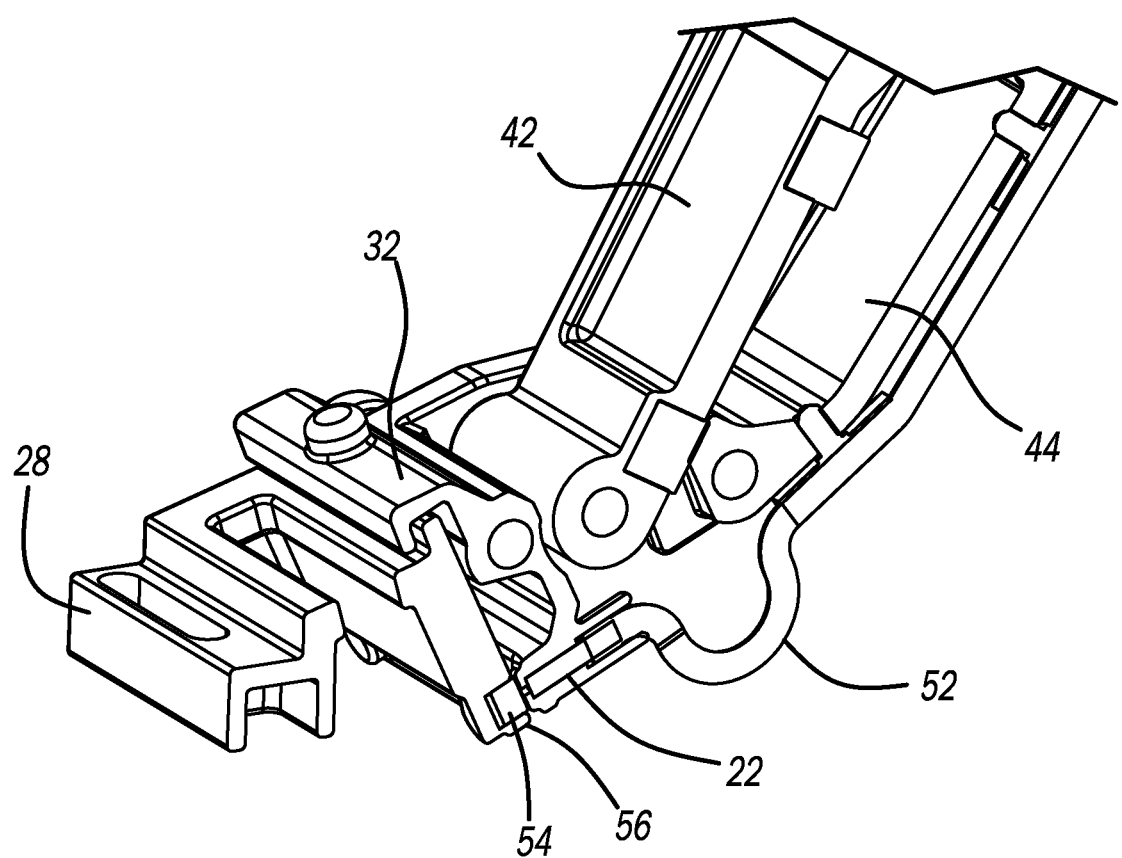
FIG. 8 is a sectional view showing the details of a reed switch assembly used in the present invention.

The link member 32 forms part of a four bar link assembly 18 which includes legs 42 and 44 which connect between the link member 32 and the upper attachment mount 50 and the driving motor 20. The upper leg 42 is the driven leg and the lower leg 44 is the following leg. The legs 42 and 44 are pivotally attached at pivot axles 46 and 48 at their respective lower ends. The lower leg 44 is pivotally attached to the attachment mount 50. The upper end of upper leg 42 is operably attached to the motor 20 for driving the step assembly 10 from the deployed position as shown in FIGS. 2 and 3, to the stowed position as shown in FIGS. 4 and 5 and vice versa. The motor 20 is wired to switch 22 by way of the conduit 52.

Referring now to FIGS. 8-12 the switch 22 is a reed switch attached in a bore in the lower end of the link member 32. A magnet 54 is secured in a bore formed in the mount 26 with a plug member 56. The magnet 54 is positioned at the reed switch 22 so that the switch is actuated when the magnet 54 is moved away from the reed switch 22. This arrangement provides a switch that is completely sealed from the environment. This protects the switch from road grime mud and the like which will be encountered by such a step attached to a pickup truck on the side or rear of the pickup truck.

Figure 11:
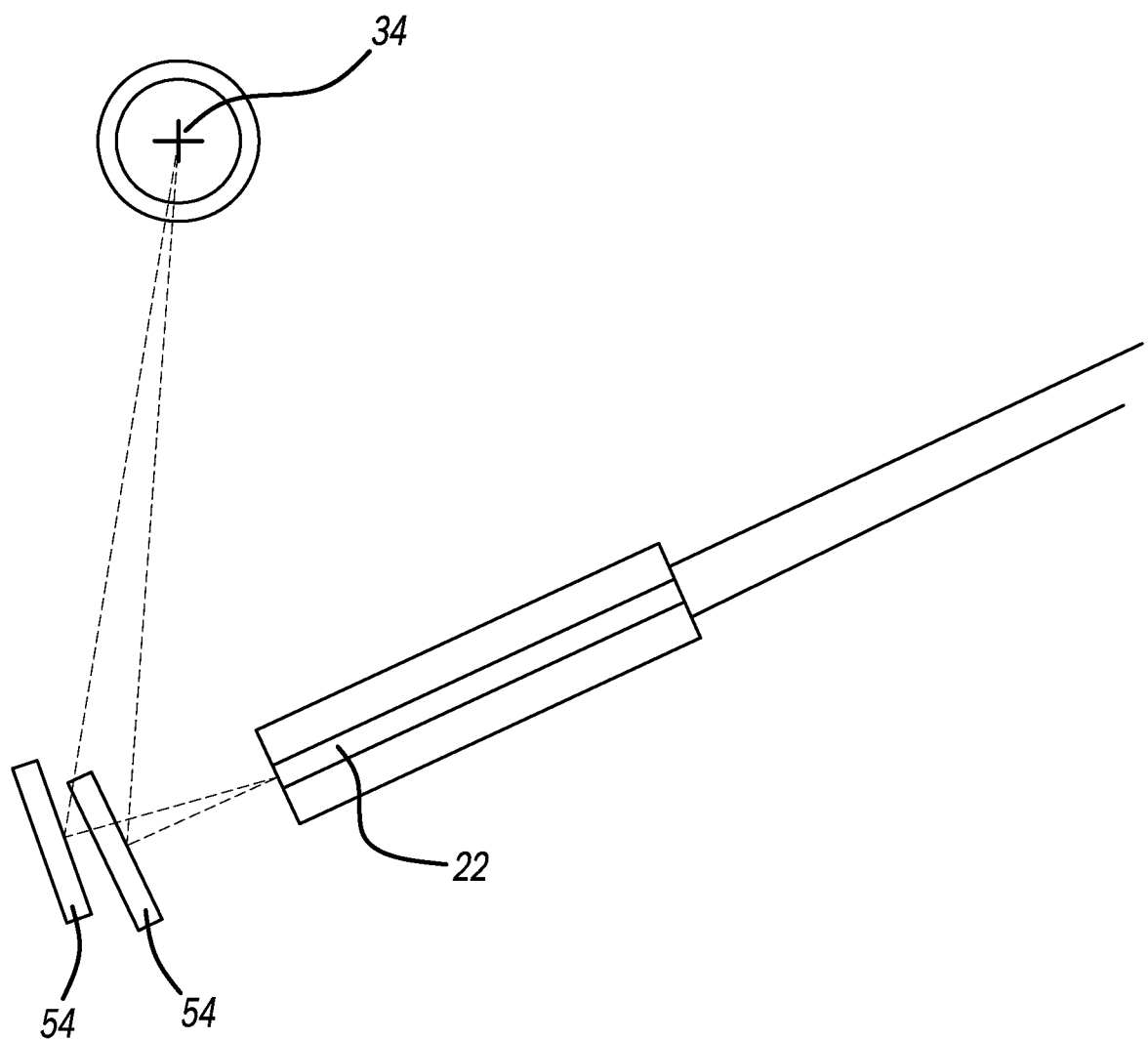
FIG. 11 is a schematic view showing the operations of the magnet and reed switch.
Figure 12:
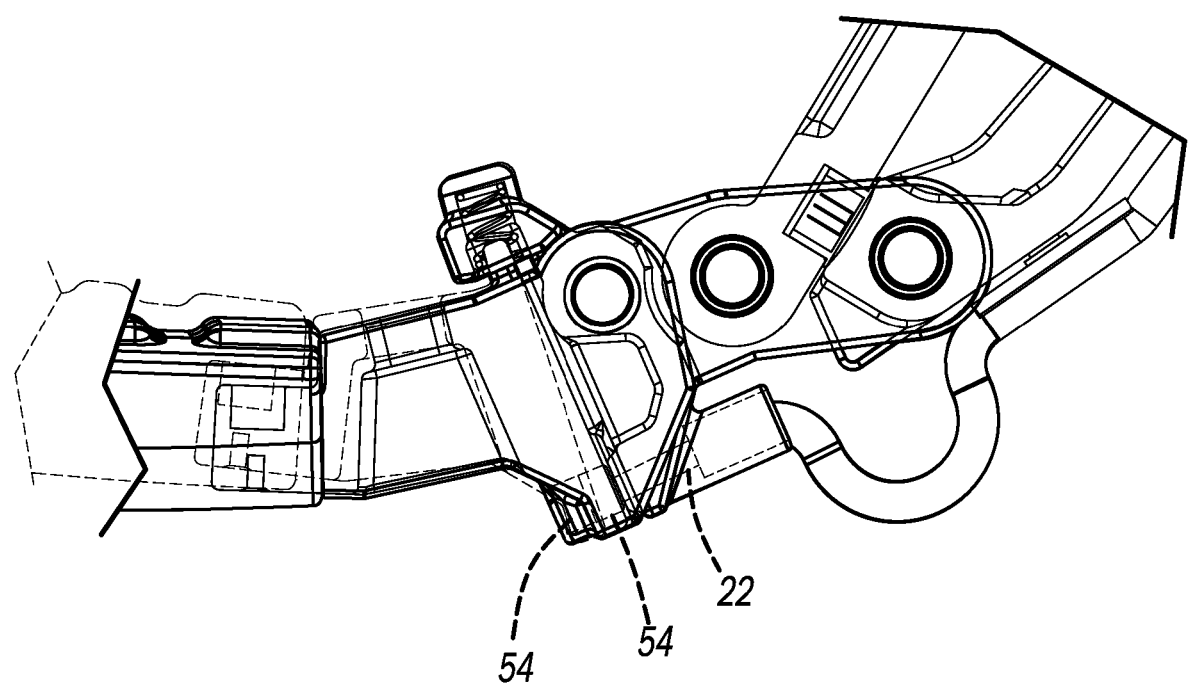
FIG. 12 is a schematic view showing the activation of the reed switch.
Figure 13:
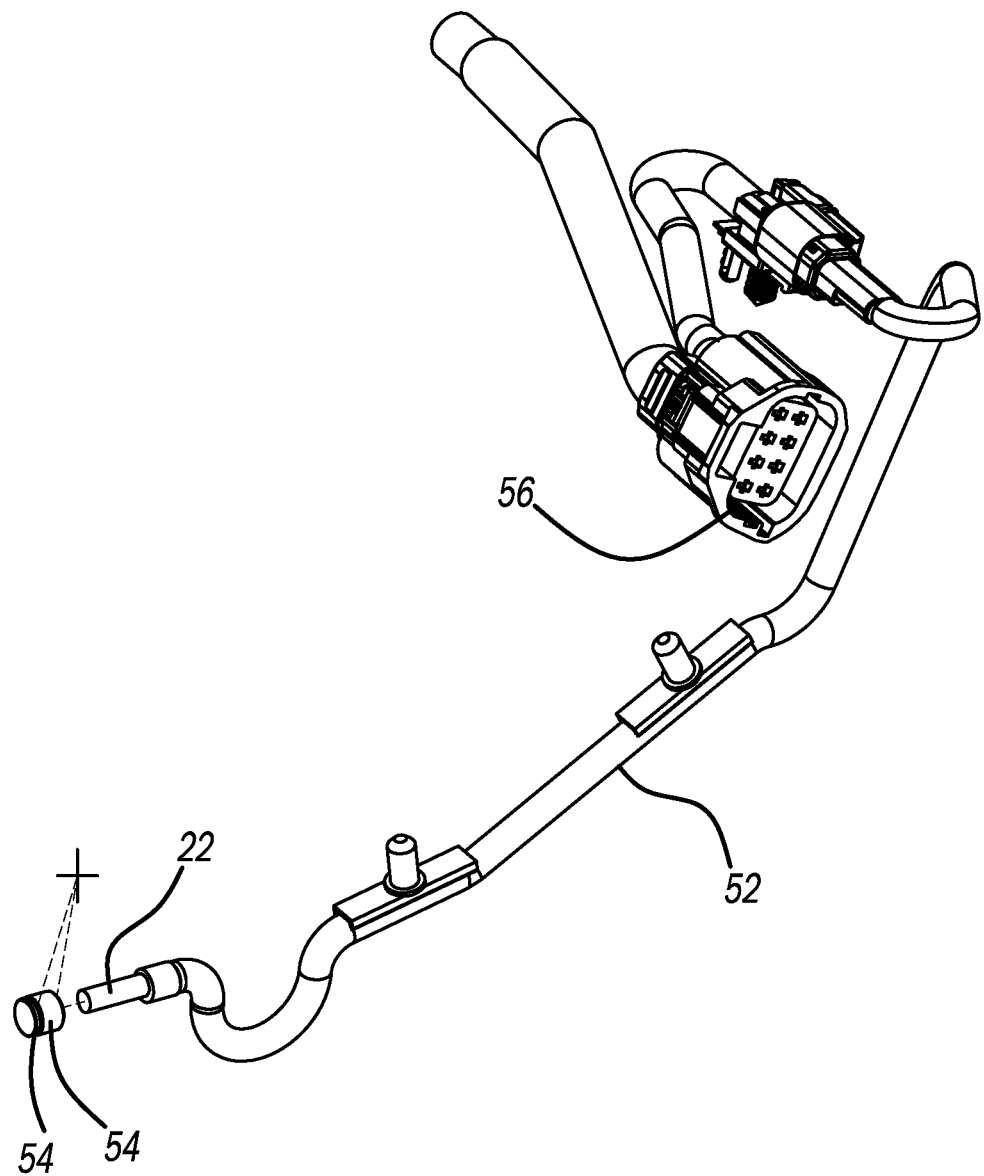
FIG. 13 is a perspective view showing the reed switch connections with the electronic control module and motor.
Figure 14:
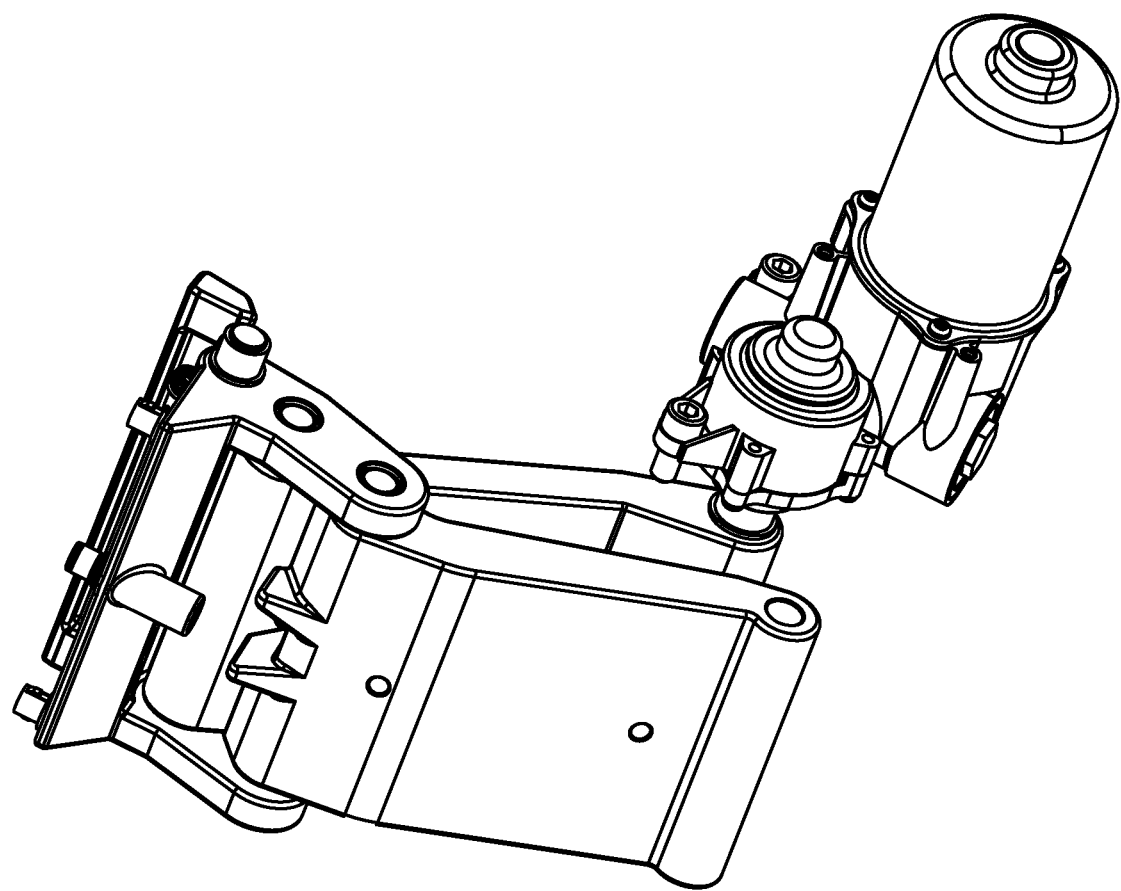
FIG. 14 is a perspective view showing detail of the four bar link.

Referring to FIGS. 11, 12 and 13 when the step is desired to be moved up or down the operator of the step 16 lifts up the outer end of step 16 in the direction 24 to accomplish the predetermined 5 degree rotation along pivot 34. This pivots the magnet 54 in the mount 26 about 3 mm to trip the reed switch 22. The control unit 56 which senses this and actuates the motor 20 moving the step 16 from deployed to stowed position or stowed to deployed position. Deploy stop bumpers 58, 60, 62 and 64 provide solid stops at each of the position which is sensed by overcurrent in the motor or the like to stop the motor and leave the step 16 in its deployed or stowed position until the reed switch it tripped again by movement of the step in the upward direction 24.

While a single step is shown, it is to be appreciated that the invention can be used in an elongated running board type assembly also or other types of linkages useful in retractable steps for a vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An articulating step assembly for a vehicle comprising:
a mount for attachment to a vehicle;
a step member;
an articulating linkage connecting the mount and the step for stowing and deploying the step;
a motor for attached to the linkage to provide raising and lowering of the step;
a limited motion hinge assembly for allowing limited hinged movement between the step member and articulating linkage;
a weather sealed switch located on the assembly for actuating the motor and linkage in response to movement of the step in a predetermined direction for deploying the step.

2. The articulating step assembly of claim 1 wherein said switch is a weather sealed switch selected from the group of: a plunger switch; a pushbutton switch; other type of weather sealed mechanical switch; a photoelectric switch a reed switch and/or another non-contact switch.

3. The articulating step assembly of claim 2 wherein said switch is a non-contact switch.

4. The articulating step assembly of claim 3 wherein said non-contact switch is a magnetic reed switch.

5. The articulating step assembly of claim 3 wherein the step member includes a magnet and is operably associated with a non-contact switch on the linkage, the step includes an assembly which allows rotation for separating the magnet from the reed switch for actuation and deployment of the step into one of the deployed or stowed positions.

6. The articulating step assembly of claim 3 wherein the linkage comprises a four bar link assembly for raising and lowering the step.

7. The articulating step assembly of claim 4 wherein the four bar link assembly has a bottom link and the step is pivotally connected to the bottom link for pivoting upward for a predetermined range of motion.

8. The articulating step assembly of claim 5 wherein the step member includes a base pivotally attached to the bottom link and the base is biased for holding the step in a downward position wherein the step can be moved upward for tripping the switch and actuating the assembly.

9. The articulating step assembly of claim 6 wherein the switch is a reed switch and a magnet is provided in the step assembly at a predetermined distance for operating the reed switch when the magnet is pivoted away during pivoting of the step.

10. The articulating step assembly of claim 7 wherein the reed switch is in the step assembly and the magnet is operably positioned in the link member.

11. The articulating step of claim 8 further comprising a motor control unit;
said motor control unit having over current sensing capabilities for sensing the limits of travel of the four bar linkage and shutting off the motor when the assembly is in the stowed position and the deployed position.

12. An articulating step assembly for a vehicle comprising:
a mount for attachment to a vehicle;
a step member;
an articulating linkage connecting the mount and the step for stowing and deploying the step said articulating linkage including a pivotal step apparatus for allowing the step to be articulated in a upward direction;
a motor for attached to the linkage to provide raising and lowering of the step;
a limited motion hinge assembly for allowing limited hinged movement between the step member and articulating linkage said limited motion hinge assembly including a base attached to the articulating linkage, said base having a u-channel portion;
said step member including a flange extending into the u-channel portion the thickness of the flange being less than the thickness of the opening in the u-channel portion for allowing limited hinged movement of the step member;
a weather sealed non-contact switch located on the assembly for actuating the motor and linkage in response to the limited hinged movement of the step in said upward direction for deploying the step.

13. The articulating step assembly of claim 12 wherein said non-contact switch is a magnetic reed switch or photoelectric switch.

14. The articulating step assembly of claim 13 wherein the step member includes a magnet and is operably associated with a non-contact reed switch on the linkage, the step includes an assembly which allows rotation for separating the magnet from the reed switch for actuation and deployment of the step into one of the deployed or stowed positions.

15. The articulating step assembly of claim 14 wherein the linkage comprises a four bar link assembly for raising and lowering the step.

16. The articulating step assembly of claim 15 wherein the four bar link assembly has a bottom link and the step is pivotally connected to the bottom link for pivoting upward for a predetermined range of motion.

17. The articulating step assembly of claim 16 wherein the step member includes a base pivotally attached to the bottom link and the base is biased for holding the step in a downward position wherein the step can be moved upward for tripping the switch and actuating the assembly.

18. The articulating step assembly of claim 17 wherein the switch is a reed switch and a magnet is provided in the step assembly at a predetermined distance for operating the reed switch when the magnet is pivoted away during pivoting of the step.

19. The articulating step assembly of claim 18 wherein the reed switch is in the step assembly and the magnet is operably positioned in the link member.

20. The articulating step assembly of claim 19 further comprising a motor control unit;
said motor control unit having over current sensing capabilities for sensing the limits of travel of the four bar linkage and shutting off the motor when the assembly is in the stowed position and the deployed position.

21. The articulating step assembly of claim 18 wherein the u-shaped channel includes biasing springs for biasing the step in a downward direction but allowing pivoting of the step in an upward direction for actuation of the switch.

* * * * *